US008661035B2

(12) United States Patent  
Jariwala

(10) Patent No.: US 8,661,035 B2
(45) Date of Patent: Feb. 25, 2014

(54) CONTENT MANAGEMENT SYSTEM AND METHOD

(75) Inventor: Adnan Shabbir Jariwala, Wanowri (IN)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 11/618,331

(22) Filed: Dec. 29, 2006

(65) Prior Publication Data
US 2008/0162528 A1 Jul. 3, 2008

(51) Int. Cl.
G06F 17/00 (2006.01)

(52) U.S. Cl.
USPC .......................................... 707/737

(58) Field of Classification Search
USPC .......................................... 707/737
See application file for complete search history.

(56) References Cited

U.S. PATENT DOCUMENTS

| | | | | |
|---|---|---|---|---|
| 4,945,476 A * | 7/1990 | Bodick et al. | | 600/301 |
| 5,524,193 A * | 6/1996 | Covington et al. | | 715/210 |
| 5,598,557 A * | 1/1997 | Doner et al. | | 707/5 |
| 6,237,025 B1 * | 5/2001 | Ludwig et al. | | 709/204 |
| 6,253,188 B1 * | 6/2001 | Witek et al. | | 705/14 |
| 6,584,492 B1 * | 6/2003 | Cezar et al. | | 709/203 |
| 6,859,909 B1 * | 2/2005 | Lerner et al. | | 715/203 |
| 6,904,560 B1 * | 6/2005 | Panda | | 715/202 |
| 7,028,253 B1 * | 4/2006 | Lieberman et al. | | 715/232 |
| 2002/0107735 A1 * | 8/2002 | Henkin et al. | | 705/14 |
| 2002/0161747 A1 * | 10/2002 | Li et al. | | 707/3 |
| 2002/0199166 A1 * | 12/2002 | Volcani et al. | | 717/100 |
| 2003/0050863 A1 * | 3/2003 | Radwin | | 705/27 |
| 2003/0158855 A1 * | 8/2003 | Farnham et al. | | 707/102 |
| 2003/0225832 A1 * | 12/2003 | Ludwig | | 709/204 |
| 2004/0107254 A1 * | 6/2004 | Ludwig et al. | | 709/204 |
| 2004/0210833 A1 * | 10/2004 | Lerner et al. | | 715/512 |
| 2005/0149729 A1 * | 7/2005 | Zimmer et al. | | 713/168 |
| 2005/0234883 A1 | 10/2005 | Szeto et al. | | |
| 2006/0041590 A1 * | 2/2006 | King et al. | | 707/104.1 |
| 2007/0055699 A1 * | 3/2007 | Kasai | | 707/104.1 |
| 2007/0130014 A1 * | 6/2007 | Altberg et al. | | 705/14 |
| 2007/0288435 A1 * | 12/2007 | Miki et al. | | 707/3 |
| 2008/0120154 A1 * | 5/2008 | Dellovo | | 705/7 |
| 2008/0221987 A1 * | 9/2008 | Sundaresan et al. | | 705/14 |

FOREIGN PATENT DOCUMENTS

JP 10301952 A2 11/1998
WO WO2006/075334 A2 7/2006

OTHER PUBLICATIONS

Joshi, D. et al., "The story picturing engine: Finding elite images to illustrate a story using mutual reinforcement," *Proceedings of the 6th ACM SIGMM International Workshop on Multimedia Information Retrieval, MIR '04*, p. 119-126 (2004).

Joshi, D. et al., "The Story Picturing Engine—A System for Automatic Text Illustration," *ACM Transactions on Multimedia Computing, Communications and Applications.*, 2(1): 68-89 (2006).

Coyne, B. and Sproat, R., "WordsEye: An Automatic Text-to-Scene Conversion System," *Computer Graphics Proceedings, Annual Conference Series.*, pp. 487-496 (2001).

* cited by examiner

Primary Examiner — Syed Hasan
Assistant Examiner — Kurt Mueller
(74) Attorney, Agent, or Firm — Hamilton, Brook, Smith & Reynolds, P.C.

(57) ABSTRACT

A system and method for content management is disclosed. Textual content is parsed into forming identified content by excluding common words. The identified content is linked to relevant images. Relevant images are searched and from a number of candidate images suitable to be inserted proximate to the identified content. A relevant image based on a ranking of the images is selected and inserted proximate to the identified content with or without human intervention.

23 Claims, 6 Drawing Sheets

CONTENT MANAGEMENT SYSTEM AND METHOD

FIELD OF THE INVENTION

This invention relates to a content management system and method for efficiently and effectively processing content.

DESCRIPTION OF THE RELATED ART

Content, particularly textual content often includes functional work, art work and the like, having no legal restriction relative to peoples' freedom to use, redistribute, improve, and share such content. Importantly, such content must be communicated in a form that an audience or end user is capable to receive and interpret. For example, creating content for a children book or web page or instant messaging etc., requires the content to be presented often with an illustration such as an image, because textual content often consists of meaning or message, which includes its emotional, intellectual, symbolic, thematic, and narrative connotations. The audience receiving such textual content may understand the content in completely different terms, thereby loosing the actual meaning of the textual content that is being presented by the user.

With the advent of document management and advances in content management, users are now capable of easily inserting images into a document by choosing an image and a desired location to insert the image. For example, most state-of-the-art word processors allow images to be embedded into content or documents as determined by a user. Such images are typically fetched by the user from a repository, which may include a database, a hard disk drive and network based storage device and the like. Typically, this is a two step process, where the users first manually select an image and then insert images into the document at the desired location. This requires the user to make a conscious decision on the location or position to insert an image in the document and to perform several other actions. While processing a document, this process of selecting and inserting images needs to be repeated for every image that is required to be inserted into until the end of content in that document is reached. Typically, to insert the image of an "apple" adjoining the text apple in a document or a web page, the user selects an appropriate image of an "apple" and then inserts the image at a desired location. This process of manually selecting and inserting the images requires investing a significant amount of time and effort to process the entire content. A further disadvantage of this process is the static nature of the content.

For example, consider a children's book. Children recognize and associate with visual appearance rather than reading textual content. Therefore, if images are inserted adjoining into a children's book adjoining the textual content, if becomes easier for the child to recognize the words, which helps the child in developing vocabulary by helping the child to read the word. Alternatively, when content is presented in different languages and the book is in a language the child does not understand, the book needs to be translated for the child to understand. Accurately translating the book may be an expensive process.

Alternatively, with the growing popularity of the Internet, if content for children is presented over the Internet, then locating appropriate images and manually inserting them at an appropriate location is a time consuming effort and includes investing a significant amount of time. Moreover, images that are dynamically fetched and inserted in a webpage are vulnerable to malicious attacks by hacker and network spoofers who may insert malicious elements thereby causing children to be exposed to material that may be termed as classified or inappropriate.

Without a way to improve the content management system and method, the promise of this technology may never be fully achieved.

SUMMARY OF THE INVENTION

A first aspect of the invention is a method for associating content, preferably textual content, with a relevant image. The textual content is parsed into words and/or phrases. A set of commonly occurring words for example as, in, or, this, that, is, so, on etc., are eliminated and the content is then organized based on the context. For example, in a context based phrase common words are not eliminated. The context based words and/or context based phrases, hereinafter referred to as identified content, is linked to a set of relevant images, preferably without human intervention. The set of images is searched, preferably without any human intervention, where the set of images contains a large number of candidate images associated with the identified content. A relevant image is inserted proximate to the content with or without any human intervention. The user may be provided with an interface enabling insertion of the relevant image adjoining the textual content.

A second aspect of the invention is a content management system consists of a core engine, which contains a content controller, an image controller and a computing controller. The content controller is configured for writing, editing and displaying content for example in a document, where the document contains textual content. The content controller is also configured to display images along with the content. The core engine contains in addition an image controller which is configured to link the identified content to a set of images, search the set of images for a relevant image and insert the relevant image proximate to the content. The core engine also contains a computing controller which is configured to compute a score and rank the set of images. The relevant image from the set of images that is selected and ranked is inserted with or without any human intervention by the core engine. Preferably, based on the historical usage, the computing controller can adaptively present the most relevant image to the user or in certain embodiments be configured to insert the most relevant image at a pre-determined location without any human intervention. Further, in the case of dynamic content management, the computing controller is configured to digitally sign and encrypt content, thereby preventing any malicious attacks.

An advantage of the present system and method of content management is that visualization of content is achieved in which textual content can be represented by meaningful images adjoining the textual content without human intervention. A further advantage is that the inclusion of the relevant images adjoining the textual content allows clarifying the subject matter and results that are presented to an audience, especially in cases of children's books, instant messaging and while dynamically updating images in content. A further advantage is that the user is not distracted from the document content, and does not requires investing a significant amount of time and effort to locate and include desired images. A further advantage is in bridging language barriers by understanding contextual content based on the images presented adjoining the text, wherein authors presenting the content and the reader of the content have different proficiency levels in the language of communication.

A third aspect of the invention comprises an electronic device, for example a computer, a laptop, a mobile phone, a personal digital assistant and the like, configured to implement the content management system for associating textual content with a most relevant image and displaying the content with text and visual features.

DETAILED DESCRIPTION

Overview

Figure 1:
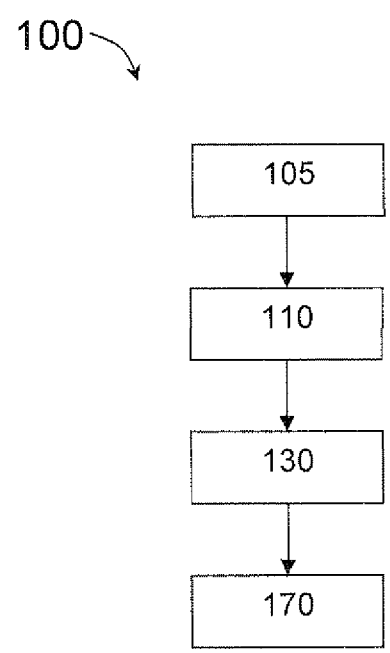
FIG. 1 illustrates an exemplary embodiment of a method for associating textual content with relevant images in accordance with the present invention.

This invention discloses a content management system and method for associating content, preferably textual content, with a relevant image. The textual content is parsed and a set of commonly available words such as definite and indefinite articles, prepositions and the like, is eliminated forming identified content. The identified content may be words and/or phrases, where in the case of phrases the connecting words are not eliminated. The identified content is linked to an image based on the context and on synonyms related to the context. A set of images is searched, for example from a repository that contains a number of candidate set of images that can be associated with identified content. A relevant image from the set of images is selected and inserted proximate to the content based on a ranking awarded to each of the images. The relevant image is inserted preferably without any human intervention. The content management system and method provides efficient and effective contextual content having textual content and relevant visual features irrespective of limitations such as language barriers or other factors.

Meaningful content can be presented to a user by dynamically inserting the right image proximate to the content. For example, consider a children's book which is presented over the Internet. Children learn faster though visual communications and this invention aids the child in reading words thereby helping children to increasing their vocabulary. It can also be used when a person desires to learn a new language. In one embodiment if the children's book is a story of a grasshopper; and the title of the story is "a grasshopper", the image of a "grasshopper" is inserted proximate to the title. The story can begin with a statement that "a grasshopper eats grass." In this case, an image of the "grasshopper sitting on grass" does not bring out the meaning and context of the content. The content management system is configured to process each of the words by inserting the image of a grasshopper adjoining the text "grasshopper," an image related to eating adjoining the word "eats," and an image representing grass adjoining the word "grass," thereby making the content not only readable but also interpretable. The images related to the word and/or synonym, of a grasshopper, of eating and of grass, are dynamically selected from the repository, and the images are ranked based on the context, and the image with the highest rank is inserted proximate to the textual content.

In another case of instant messaging such as a chat program, involving a sender and a receiver, consider that the sender and the receiver are communicating in different languages. The messaging application in association with the content management system is configured to search for and insert a relevant image adjoining the context based word and/or phrase, and then push the content, now consisting the text and the image to the receiver. For example, if there is a statement such as "An animal that gives us milk" typed by a japanese sender. The content can be formatted in context based words such as "animal" and "milk." However there are several animals that give milk. Hence, in this case, the content management system analyses that instead of context based words, context based phrase would be better suited. The text "an animal that gives us milk" may be represented by the image of a "cow," with or without any human intervention. Thus, even though the receiver is not capable of fully understanding the language of the original message, by inserting a relevant image adjoining the textual content, the receiver is capable of deciphering the textual content because of the context based images in the textual content.

Workflow

FIG. 1 illustrates an exemplary embodiment of a method 100 for associating textual content with relevant images and subsequently presenting content that contains text and visual features. The method 100 for presenting content, preferably to the end user or an audience, involves inserting a relevant image adjoining or proximate to the identified content. In one embodiment, input content is provided at 105 in a suitable format by retrieving existing textual content from a source, such as a file, or entering new textual content using a keyboard and the like. In a further embodiment, the input content is processed into context based words 110 by excluding a set of common words such as definite and indefinite articles, prepositions etc. In a further embodiment, processing the input content is preferably done by not eliminating the set of common words connecting the main keywords thereby forming context based phrases 110 instead of context based words. The identified content is linked to relevant synonyms and is then processed to be represented by relevant images in 130 at a location proximate to the identified content. Once the identified content is processed by selecting and inserting the relevant images in 130 proximate to the identified content, a final form of the content now including the originally input textual content and the relevant images proximate to the identified content are presented to the end user in 150.

Figure 2:
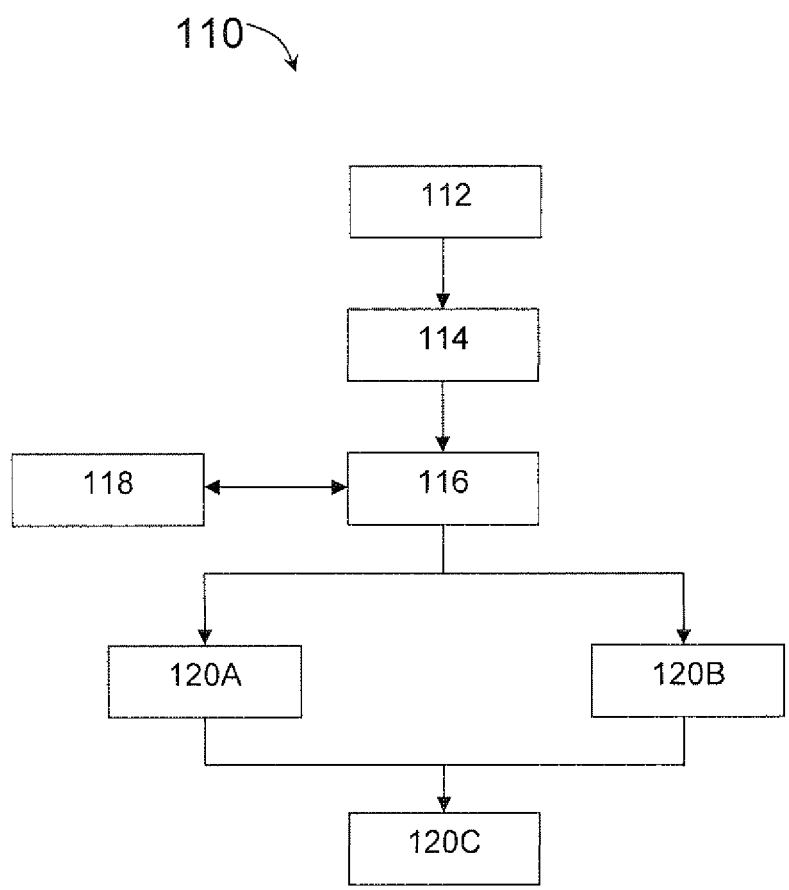
FIG. 2 illustrates an exemplary embodiment of a method for processing input textual content creating identified content.

FIG. 2 illustrates an exemplary embodiment of a method for processing textual content to create identified content 110, preferably without any human or manual intervention. The content which is input, for example a document in a word processor already having textual content or a document formed with new textual content, is first received in 112. After the content is received in 112, either in part of in full, the content is parsed in 114 to analyze the grammar and structure of the textual content. Analyzing the textual content that is parsed allows the system 500 to determine if the content should be presented as words and/or phrases. Preferably, the content is parsed in 114 without any human intervention, for example the word processor is built with the capability to analyze the grammar and structure of the textual content. After parsing the textual content, in 116 the identified content 120C, i.e., either context based words 102A and/or context based phrases 120B are formed by excluding a set of common words from the textual content at the appropriate locations. For example the set of common words includes definite and indefinite articles, prepositions and the like, which are defined in an exclusion list 118. The exclusion list can be dynamically updated with new words. In one embodiment, while the context based phrases 120B are formed the set of common words connecting the other keywords words forming the phrase are left intact in the textual content.

Figure 3:
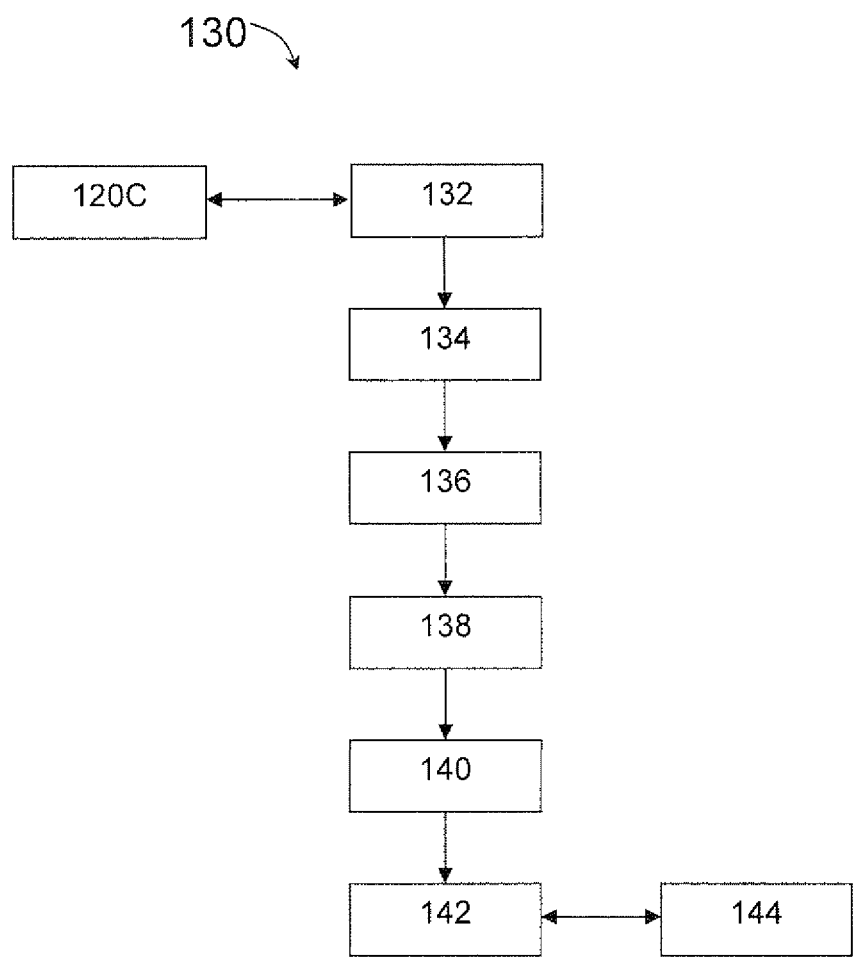
FIG. 3 illustrates an exemplary embodiment of a method for identifying and inserting a relevant image adjoining the identified content.

FIG. 3 illustrated an exemplary embodiment of a method for identifying and inserting relevant images proximate to identified content 130. After the textual content has been reorganized and the identified content 120C (FIG. 2) is formed, the identified content 120C is processed such that relevant images may be identified and inserted adjoining the identified content 120C, preferably without human intervention. In one embodiment, the images with the topmost ranking can be displayed to the user and the user can select the appropriate image via a user interface. The method of processing an image 130 for the identified content 120C consists of identifying a location for inserting the relevant image in 132, which is preferably adjoining the identified content 120C. After the location for inserting the image is identified which is preferably adjoining the identified content, in 134 the identified content 120C is linked to a suitable synonyms for such that the identified content and it's synonyms. After linking the identified content 120C to synonyms that are then linked to the set of images, in 136 the set of images that are relevant to the context are searched prior to linking the images to the relevant content. In 138 the list of images is compiled and ranked and then linking the identified content 102C, there images being the ones that are relevant to the context.

The search 136 is normally performed on a local repository or network based repository or in any other storage medium that may be accessible, to locate and compile a list of suitable and relevant images. It should be apparent to a person skilled in the art that not all relevant images are presented in 138, but for example based on previous usage history, a list of only the most relevant images based on the context are located and compiled. For example, in a certain embodiment, the list of images that are relevant to the context can be complied based on a ranking assigned to the images by computing a score. Images can be ranked in general based on some calculated similarity order by applying best-match techniques, for example computing a similarity measure. One such example is a content-based image retrieval algorithm disclosed by Markkula Marjo et al., A Test Collection for the Evaluation of Content-Based Image Retrieval Algorithms—A User and Task-Based Approach; which is herein incorporated by reference in its entirety, wherein Content-based image indexing aims to automatic identification and abstraction of the visual content of an image. It should be apparent to a person skilled in the art that several other techniques may be used to search and retrieve images and these techniques fall within the scope of this invention. Other models such as statistical correlation model for image retrieval can also be used, for example Li Mingjing et al, Statistical correlation analysis in image retrieval; which is herein incorporates by reference in its entirety. Statistical correlation models capture the semantic relationships among images in a database from simple statistics of user provided relevance feedback information. It is applied in the post-processing of image retrieval results such that more semantically related images are returned to the user. Such algorithms are easy to implement and can be efficiently integrated into an image retrieval system to help improve the retrieval performance. These models improve image retrieval performance for both content-based and text-based queries.

The set/list of relevant images that is located and compiled is (pre)-fetched in 138. After (pre)-fetching the set of relevant images, the set of relevant images may be presented to the user in 140 in one embodiment. The full set of the (pre)-fetched image is locally cached and presented to the user at a later instant or may be presented to the user at the pre-determined location without storing such images in the local cache. The images are presented at a location adjoining the identified content 120C. If the set of images is stored in the memory, then the set of images may be identified by a location address of a pointer in the memory which points to the location of the identified content 120C.

After the set of relevant images is presented adjoining the identified content 120C, the relevant image is inserted in 142 adjoining the identified content 120C. In an alternate embodiment, the relevant image may be inserted adjoining the identified content in 142 without any human intervention after (pre)-fetching without being presented to the user. For example, this can be implemented by building artificial intelligence (AI) and/or fuzzy logic based networks into the content management system.

Reference is now made again to FIG. 1, wherein after processing the content in 120 and forming identified content to be represented by relevant images, in 150 a final form of the content is presented which includes the original textual content and visual features adjoining identified content, where the visual content adjoining the identified content now forms part of a new content presented to a user/audience. In a certain implementation, the process of image processing 140 may be performed in the background while other tasks for example textual content processing 120 may be performed in the foreground. The content presented to the user which consists of textual content and accompanying context based visual representations is more meaningful and easier to be interpreted by any audience.

Processing of Content

Figure 4:
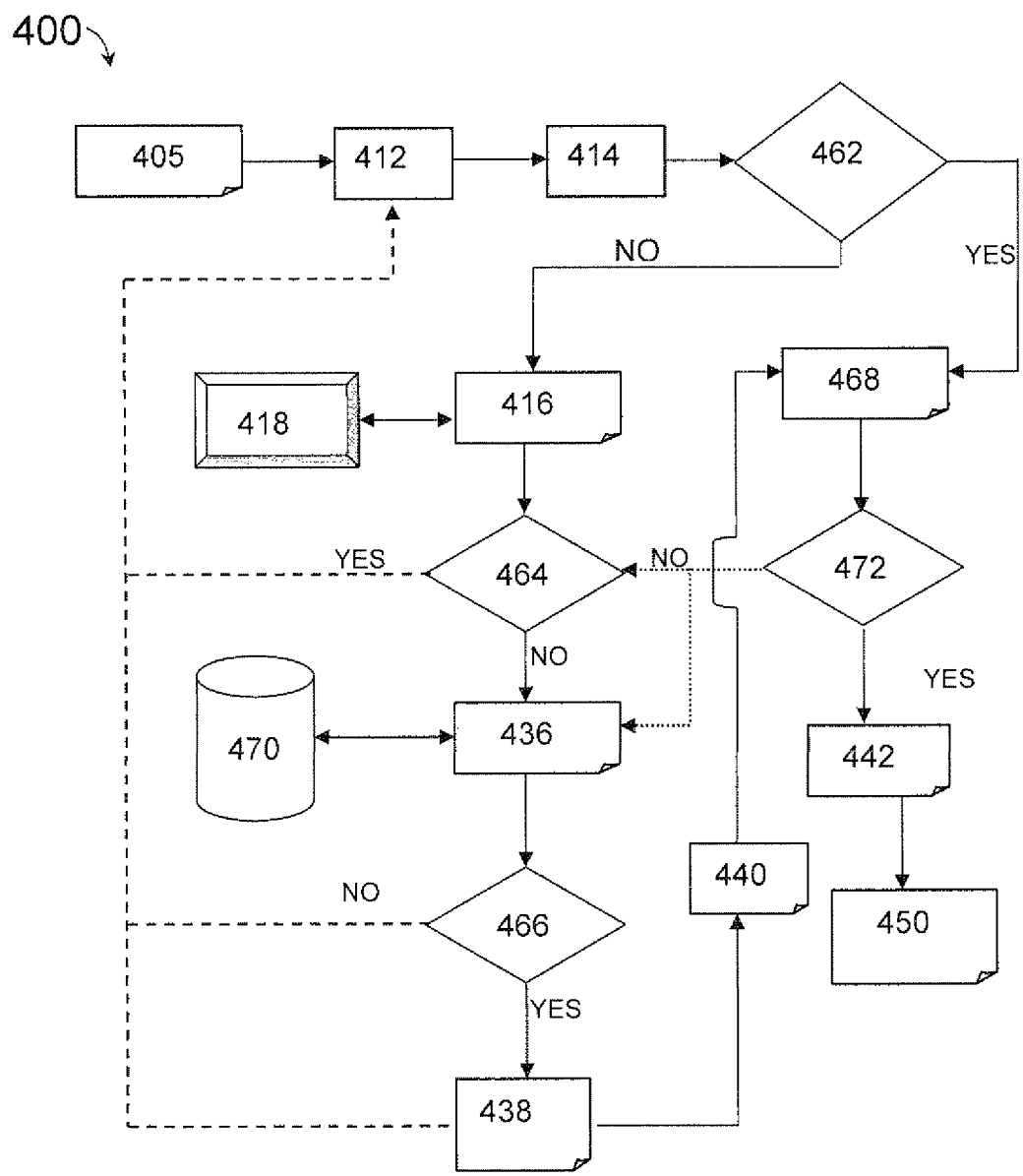
FIG. 4 illustrates an exemplary embodiment of a method for processing textual content and inserting a relevant image adjoining the identified content.

FIG. 4 illustrates a workflow for processing textual content and inserting relevant images adjoining the identified content. For example, consider a children's book, preferably in electronic form which is presented to the child over the Internet. Presenting textual content 405 to the audience is subjective depending on the capability of the audience to interpret the textual content 405. Typically, children are well adapted to interpret visual features than read textual content. Therefore, it may be meaningful to insert visual content or visual features proximate to the textual content in order to interpret the textual content 405, which also aids the child in improving it vocabulary and reading abilities. Alternatively, the textual content 405 may be in a language that the children cannot read, for example if the child is taught English and the content is in Chinese and the book being very popular, children would like to read the book. It should be apparent to a person skilled in the art that the invention is not restrictive to textual content 405 being presented for children or to an electronic book, but all textual content that can be represented by visual content adjoining the identified content fall within the scope of this invention. For example, textual content in web pages, textual content in word processors, textual content in instant messaging, textual content in email etc., are covered within the scope of this invention. In one embodiment, the content can be provided with link which can fetch the images and dynamically updated the images proximate to the identified textual content. In such a case the database of images from where the images are searched and inserted into the content are controlled by a trusted group thereby preventing any malice of distorting the links towards inappropriate images.

The textual content is received in 412 and is subsequently parsed in 414, which has been discussed previously with reference to FIG. 2. A check is introduced in 462 to determine if the end of the textual content is reached, i.e., all the textual content has been parsed. If all the content has not been processed, control is passed on to 416 where a list/set of common words, as described previously in FIG. 2, is excluded from the textual content. The list/set of common words may include articles, prepositions and the like that are present in an exclusion list 418 which is used to exclude the common words in 416. If the entire textual content which is parsed and the list of common words are appropriately excluded, control is transferred to 464. In 464, a check is made to determine if the textual content word defined is the exclusion list. If the content has not been appropriately processed, then control is transferred back to 412 until all the common words are removed from the textual content. However, the exception arises while forming phrases, in which case the connecting articles, prepositions between the keywords that are forming the phrase are not removed, thereby forming a context based phrase. When the end of the textual content is reached, the control is passed to 468.

After exclusion of the common words in 416 from the textual content, the textual content is then reorganized to form identified content. When all the textual content has been eliminated of the common words and cleaned forming appropriate content for further processing, in 436 a set of relevant images is searched in a repository 470. The repository 470 may be connected via a wired or wireless means. Control is now transferred to 466 to determine if an image or a set of relevant images is found based on the identified content. If no images are found the control is transferred back to 412 to reorganize the context of the word and/or the phrase. If a set of relevant images are found, then in 438 the set of relevant images are prepared and (pre)-fetched from the repository or any other location from where the images are available and the set of images are linked to the identified content. Once the set of relevant images is prepared and (pre)-fetched and linked to the identified content, control is then transferred to make a set of relevant images to be presented to the user in 440, wherein the set of relevant images are mapped in accordance with priority based on the context of the word and/or phrase by ranking the images. For example, one means to present the set most relevant images to the user is by calculating the probability score of the image with reference to the identified content. It should be apparent to a person skilled in the art that various other computational methods are available to calculate a probabilistic or statistical score for ranking the images vis-à-vis the identified content and such methods fall within the scope of this invention.

After the set of images is presented to the user in 440 in one embodiment, the set is read by the user in 468 and the control is transferred to 472 where it is determined whether there are any images or not in the set of relevant images. If there are no images found in the list, then the control is transferred back to 464 and the process is repeated to find suitable identified content such that an image may be found. Alternatively, the system can leave the content unassociated. When an image is found in 472, control is transferred to 442 where the most relevant image is inserted adjoining the identified content and a final version of the content is presented to the audience. The final content 450 is a combination of textual content and visual features adjoining the identified content. In one embodiment, in 442 the list of most relevant images may be displayed to the user and the user may select the most relevant image to be inserted proximate to the identified content.

Alternatives to Processing of Content

In a further embodiment, the content may be presented to the audience with an option to view the document with or without the visual content. In yet a further embodiment, the images may be inserted into the textual content with or without any manual intervention. Therefore, by presenting textual content accompanied by relevant images adjoining the identified content, the audience better and meaningful readability based on the context. Further, such presentation also increases the capability of the audience to correctly interpret the textual content in case of different languages being used to present the content.

In a further embodiment, if the feature of displaying visual content adjoining identified content is enabled, for example from content that is retrieved and that content has not been processed, the method is configured to process the content as implemented in the methods of FIG. 1-4, forming identified content and inserting the most relevant image adjoining the identified content and present the new content to the user. If the feature of displaying visual content is disabled then the content retrieved is displayed without any visual content.

Content Management System

Figure 5:
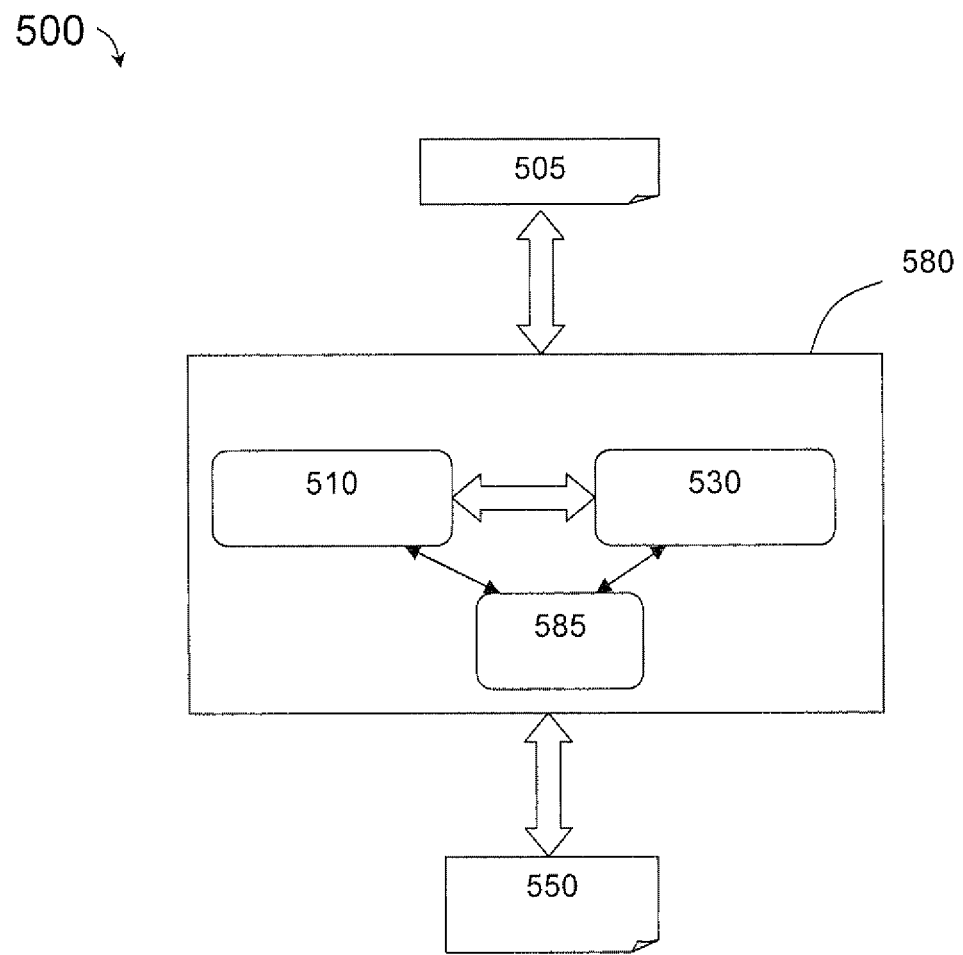
FIG. 5 illustrates a schematic representation of a content management system.

FIG. 5 shows a schematic representation of a content management system 500 capable of implementing the method described in FIGS. 1-4. The content management system 500 comprises input textual content 505 to a content processing system 580. The content processing system 580 forms the core engine of the content management system 500. The content processing system 580 is configured to output processed content 550, which consists of textual content and visual features adjoining identified content.

The content processing system 580 of the content management system 500 comprises a content controller 510, an image controller 530 and a computing controller 585. The content controller 510 is configured to receive the input textual content, parse the input textual content and eliminate a list of common words from the textual content to from the identified content. The list/set of common words that are excluded from the input content provided to the content processing system 580 are typically defined in an exclusion list (not shown in the Figure). The content controller 510 is also configured to locate a list of synonyms (not shown in the Figure) for the identified content that may be stored in the content processing system 580 or in another repository external to the content processing system 580 and interfaced with the content processing system 580. The content processing means is also configured to identify the location to insert the most relevant image based on the identified content.

The image controller 530 is configured to search the repository (not shown in the Figure) for a list/set of relevant images, compile, link and present the set of relevant images adjoining the identified content and provide an interface to insert the relevant images at the location determined. However, because specific identified content can potentially be represented by a large number of images, a computing controller 585 is configured to compute a score for each of the images that are retrieved to form a candidate set of images. Based on the computed score, only images that are above a certain pre-defined threshold are compiled, linked to the identified content, and presented to the user. This threshold can dynamically change for varying set of images and varying set of identified content, for example, if the user always wants to view at least two choices. The content controller 510, the image controller 530 and the computing controller 585 which form the content processing system 580 are configured to work in conjunction with each other. In certain embodiment, the computing controller 585 may be disabled.

In a further embodiment, if the feature of displaying visual content adjoining identified content is enabled or disabled by the content management system 500 such that the method described under FIGS. 1-4 may be implemented, thereby forming identified content and inserting the most relevant image adjoining the identified content and present the new content to the user. If the feature of displaying visual content is disabled, then the content retrieved is displayed without any visual content.

Device

Figure 6:
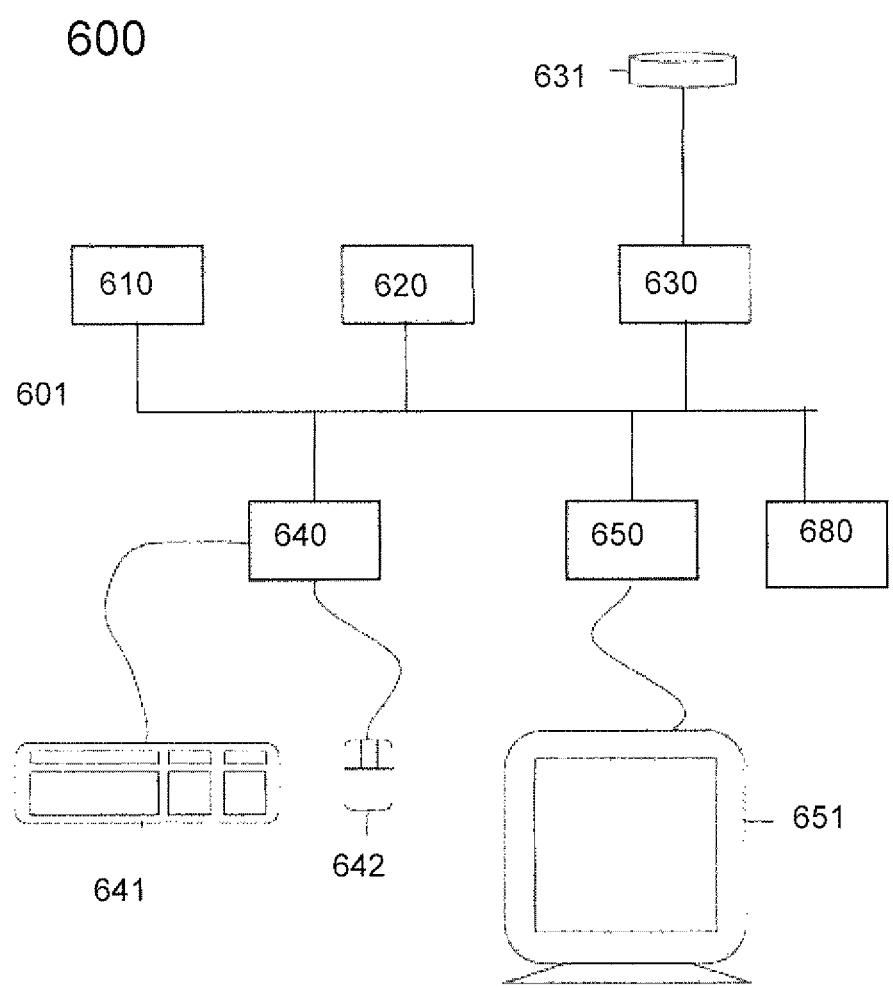
FIG. 6 illustrates an electronic device suitable for implementing the method of FIGS. 1-4 and the content management system of FIG. 5.

FIG. 6 schematically shows an embodiment of an electronic device 600, for example a computer system. The electronic device is a general-purpose computing device. In other embodiments, the electronic device 600 may be implemented as a personal computer, portable computer, laptop or notebook computer, PDA (Personal Digital Assistant), tablet computer, pocket computer, mobile or wireless telephones, pager, teleconferencing system, appliance or any other appropriate type of electronic device. It should be understood that FIG. 6 is only intended to depict the representative major components of the electronic device 600 and that individual components may have greater complexity than that represented in FIG. 6.

The electronic device 600 comprises a system bus 601. A processor 610, a memory 620, a disk I/O adapter 630, a network interface (not shown in the Figure), a transceiver for communication (not shown in the Figure), a user interface (UI) adapter 640 and a the core engine 680 of the content processing system which are all coupled to the system bus 601. A disk storage device 631 is operatively coupled to the disk I/O adapter 630. A keyboard 641, a mouse 642 (optional element) and a display 643 are coupled to the UI adapter 640. A display device 651 is coupled to the system bus 601 via a display adapter 650 and arranged to display the textual content and/or the textual content with the visual features.

The electronic device 600 is configured to load the program into memory 620 and execute the program on the processor 610. The user inputs information to the electronic device 600 using the keyboard 641 and/or the mouse 642. The electronic device 600 outputs information to the display device 651 coupled via the display adapter 650. The skilled person will understand that there are numerous other embodiments of the electronic device known in the art and that the present embodiment serves the purpose of illustrating the invention and must not be interpreted as limiting the invention to this particular embodiment.

The content processing system 680 of the content processing system is coupled to the system bus 601 and configured to receive input in the form of textual content, process the textual content and output content on the display 651 of the device. Processing of the content and images has been described previously in FIG. 5.

Examples

For example, in the case of instant messaging, such as a chat program involving a sender and a receiver, consider that the sender and the receiver are communicating in different languages. Therefore, for effective communication, as the user is typing textual content in a messaging window, the messaging application (in this case combined with the content management system) is configured to adaptively process the content by excluding the common words from the input textual content forming identified content. The messaging application is then configured to search an image repository for suitable images, rank the images, link the images to the identified content and insert the most relevant image or a link to the most relevant image adjoining the identified content. It should be apparent to a person skilled in the art, that some or all of these step can be performed in different permutations with the final result of an image being inserted proximate to the identified content. When the user click the send button, the content along with the relevant images or link is pushed to the receiver. Therefore, even though the language of communication is different, a sender and receiver are able to effectively communicate over an instant messaging system. For example, if the sender send a text such as "An animal that gives us milk". The content can be processed into context based words such as "animal" and "milk". However there are several animals that give milk. Hence, in this case, the content management system analyses that instead of context based words, context based phrase would better suit and the text "an animal that gives us milk" may be represented by the image of a "cow" and/or "milk," thereby effectively communicating the message to the receiver because the receiver is now capable of deciphering the textual from the context based images. In one embodiment, the processing of the textual content to insert the visual content may be performed with or without any human intervention.

For another example, if the sender is typing a message such as "a grasshopper eats grass". In this case instead of forming context based phrase where an image of the "grasshopper on grass" does not bring out the meaning and context of the content, it is suitable to form context based words. Therefore, in such cases, the content management system is configured to process each of the context based words by inserting the image of a grasshopper adjoining the word "grasshopper," an image related to eating adjoining the word "eats" and an image representing grass adjoining the word "grass," thereby making the content not only readable but also effective for the receiver to interpret. As will be appreciated by a person skilled in the art, other forms of textual content like document processing, web page processing and the like which involve processing of any form of textual content to represent the textual content with context based visual features fall within the scope of this invention.

For another example, if on a webpage content is being displayed as discussed earlier as a children's book or in any other form, it would be useful to insert images to establish effective communication. The content management system processes the text on the web page which can be preformed real-time or can be previously linked to set of images. When the website is opened, the content is displayed with relevant images proximate to the identified content. However, because the Internet is prone to attacks by hackers and network spoofer, images are linked and fetched only from a trusted source preventing displaying of inappropriate content. It should be apparent to a person skilled in the art that several other form of presenting content where images can be inserted advantageously for effective communication fall within the scope of this invention. In one embodiment, the word processor or the browser can be provided with a functionality to enable and/or disable content with textual features and relevant images being displayed.

CONCLUSION

The various components illustrated in FIGS. 1-6 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system, and that, when read and executed by one or more processors in the computer system, cause the computer system to perform the steps necessary to execute steps or elements comprising the various aspects of an embodiment of the invention. The various software components may also be located on different systems.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention. Therefore, it is desired that the embodiments described herein be considered in all respects as illustrative, not restrictive, and that reference be made to the appended claims for determining the scope of the invention.

Although the invention has been described with reference to the embodiments described above, it will be evident that other embodiments may be alternatively used to achieve the same object. The scope of the invention is not limited to the embodiments described above, but can also be applied to software programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware and software comprising several distinct elements.

What is claimed is:

1. A computer method for associating textual content with a relevant image comprising:
    receiving textual content as composed by an author user, the textual content having one meaning by the author user;
    based on historical usage by other users, determining additional meaning for the textual content, the additional meaning being beyond the one meaning of the author user and including synonyms;
    adaptively linking the textual content to at least one image clarifying subject matter of the textual content, said clarifying of the subject matter being by treating textual content beyond terms of the one meaning of the author user and including the synonyms of the determined additional meaning;
    forming a visualization of content, by inserting a relevant image from the at least one image proximate to the textual content in a manner resulting in clarification of the subject matter of the textual content, wherein the adaptively linking and inserting is free of human intervention, and the formed visualization effectively enables a reader user to not only receive but interpret and understand the subject matter based on the relevant image presented adjoining the textual content; and
    displaying the formed visualization of content to one or more reader users in a manner establishing effective communication of the subject matter, each reader user being a different person than the author user.

2. The computer method of claim 1, further comprising:
    parsing the received textual content into words;
    excluding a set of common words from the parsed textual content, wherein the set of common words being predefined in an exclusion list.

3. The computer method of claim 1, further comprising:
    identifying a location proximate to the textual content for inserting the relevant image based on the textual content, said identifying location being free of human intervention.

4. The computer method of claim 3, further comprising:
    searching a repository for the at least one image;
    fetching the at least one image from the repository; and
    presenting the at least one image to the author user.

5. The computer method of claim 4, further comprising:
    computing a score for each of the images fetched from the repository, and ranking the fetched images according to the computed score prior to presenting the at least one image to the author user.

6. The computer method of claim 4, wherein the images are fetched only from a trusted source.

7. The computer method of claim 4, further comprising:
    forming a list of images fetched from the repository; and
    identifying and selecting the relevant image to be inserted proximate to the textual content from the list of images.

8. The computer method of claim 2, further comprising:
    grouping a set of words forming a context based phrases prior to identifying a location for inserting the relevant image proximate to the contextual phrase from the at least one image after excluding the set of common words.

9. A content management system comprising:
    (a) a computer having a content processing system which comprises:
        a content controller receiving content composed by an author user and creating identified content, the content composed by the author user having one meaning by the author user; and
        an image controller inserting images by associating the identified content with at least one image clarifying subject matter of the identified content, and forming a visualization of content, the image controller associating the identified content with the at least one image in a manner free of human intervention; and
        wherein the clarifying of subject matter includes:
        (i) based on historical usage by other users, determining additional meaning for the identified content, the additional meaning being beyond the one meaning of the author user and including synonyms of the identified content and
        (ii) treating textual content beyond terms of the one meaning to the author user including the synonyms of the determined additional meaning, and
        wherein the formed visualization effectively enables a reader user to not only receive but interpret and understand the subject matter based on the relevant image presented adjoining the textual content; and
    (b) output display means for displaying the formed visualization of content to one or more reader users, the displayed visualization of content bridging any language barrier between any reader user of the identified content and the author user of the received content, each reader user being a different person than the author user.

10. The content management system of claim 9, further configured to fetch the at least one image from a trusted source.

11. The content management system of claim 9, wherein the content processing system is configured to authenticate the at least one image.

12. The content management system of claim 9, wherein the content processing system further comprising a computing controller for computing a score for each of the images.

13. The content management system of claim 12, wherein the computing controller is configured to rank the images based on the computed score.

14. The content management system of claim 13, wherein the image controller associates the identified content with only images above a pre-defined threshold score.

15. The content management system to claim 14, wherein relevant images above a pre-defined threshold score are inserted proximate to the identified content without any human intervention.

16. The content management system of claim 9, wherein the content controller is configured to determine location to insert a relevant image proximate to the identified content without human intervention.

17. The content management system of claim 9, wherein the image controller is configured to authenticate and insert a relevant images without any human intervention.

18. The content management system of claim 9, wherein the content processing system is configured to enable the feature of processing input content without any human intervention.

19. An electronic device having content management, the electronic device comprising:
   A. a storage repository configured to store textual content and images, each textual content being authored by a respective author user, the textual content having one meaning by the author user;
   B. a memory configured to cache images from the storage repository;
   C. a computer having a processor coupled for communication with the memory and storage repository, and the processor being configured to
      (i) identify content,
      (ii) to retrieve images and
      (iii) to form a visualization of content by inserting at least one relevant image proximate to the identified content,
      each relevant image clarifying subject matter of the identified content, including;
      (i) based on historical usage, determining additional meaning for the textual content, the additional meaning being beyond the one meaning of the author user and including synonyms of the textual content, and
      (ii) treating textual content beyond terms of the one meaning to the author user and including the synonyms of the determined additional meaning, and in a manner such that display of the formed visualization of content to one or more reader users bridges any language barrier between any reader user of the identified content and the author user of the stored textual content by effectively enabling a reader user to not only receive but interpret and understand the subject matter based on the relevant images presented adjoining the textual content, each reader user being a different person than the author user,
      wherein the processor identifying content, retrieving images and forming the visualization of content is in a manner free of human intervention; and
   D. a display device coupled to receive from the computer the formed visualization of content and configured to display the visualization of content to reader users in a manner establishing effective communication of the subject matter.

20. The electronic device of claim 19, wherein the processor is further configured to compute a score for each of the retrieved images and rank the retrieved images in accordance with the computed score.

21. The electronic device of claim 19, wherein the processor is further configured to, free of human intervention:
   (a) link the textual content to images;
   (b) search a repository for relevant images;
   (c) retrieve the relevant images;
   (d) link one of the retrieved images to the identified content;
   (e) computing compute a score for ranking retrieved images; and
   (f) subsequently present one or more of the ranked images to the author user to be inserted proximate to the identified content.

22. The electronic device of claim 19, wherein the processor is further configured to:
   (a) link the textual content to images;
   (b) search a repository for relevant images;
   (c) retrieve the relevant images;
   (d) link one of the retrieved images to the identified content;
   (e) computing compute a score for ranking retrieved images; and
   (f) subsequently present the retrieved images to the reader user inserted proximate to the identified content without human intervention.

23. A computer program product for deploying computing infrastructure, the computer program product comprising:
   a computer usable memory medium having computer readable program code embodied therewith, wherein the computer readable program code comprises:
   computer readable program code configured to receive textual content by an author user, the textual content having one meaning to the author user;
   computer readable program code configured to adaptively link, without human intervention, the textual content to at least one image clarifying subject matter of the textual content, said clarifying of the subject matter including:
      (i) based on historical usage by other users, determining additional meaning for the textual content, the additional meaning being beyond the one meaning of the author user and including synonyms of the textual content, and
      (ii) treating textual content beyond terms of the one meaning to the author user and including the synonyms of the determined additional meaning; and
   computer readable program code configured to form a visualization of content by inserting a relevant image from the at least one image proximate to the textual content in a manner free of human intervention and in a manner resulting in clarification of the subject matter of the textual content, said formed visualization effectively enables a reader user to not only receive but interpret and understand the subject matter based on the relevant image presented adjoining the textual content; and
   computer readable program code configured to display the formed visualization of content to one or more reader users, the display of the formed visualization of content being in a manner establishing effective communication of the subject matter and including bridging any language barrier between any reader user of the textual content and the author user of the textual content, each reader user being a different person than the author user.

* * * * *